US011089064B1

(12) United States Patent
Sarukkai et al.

(10) Patent No.: US 11,089,064 B1
(45) Date of Patent: Aug. 10, 2021

(54) CLOUD SECURITY POLICY ENFORCEMENT FOR CUSTOM WEB APPLICATIONS

(71) Applicant: Skyhigh Networks, LLC, Campbell, CA (US)

(72) Inventors: Sekhar Sarukkai, Cupertino, CA (US); Prasad Raghavendra Somasamudram, Bangalore (IN); Rama Taraniganty, Cupertino, CA (US); Vikram Jaiswal, Fremont, CA (US); Chapman Seto, San Jose, CA (US); Ravi Hingarajiya, Sunnyvale, CA (US); Surendrakumar Viswanathan, Santa Clara, CA (US); Kaushik Narayan, San Jose, CA (US); Pradeep Kumar Reddy Mangalapuri, Bangalore (IN); Guruprasad Shenoy, Bangalore (IN)

(73) Assignee: Skyhigh Networks, LLC, Campbell, CA (US)

( * ) Notice: Subject to any disclaimer, the term of this patent is extended or adjusted under 35 U.S.C. 154(b) by 111 days.

(21) Appl. No.: 15/341,463

(22) Filed: Nov. 2, 2016

Related U.S. Application Data

(60) Provisional application No. 62/393,466, filed on Sep. 12, 2016.

(51) Int. Cl.
*H04L 29/06* (2006.01)
*H04W 24/08* (2009.01)
(Continued)

(52) U.S. Cl.
CPC ........ *H04L 63/205* (2013.01); *H04L 43/0876* (2013.01); *H04L 63/0281* (2013.01); *H04L 63/1408* (2013.01)

(58) Field of Classification Search
CPC .............. H04L 63/205; H04L 63/0281; H04L 63/1408; H04L 43/0876
See application file for complete search history.

(56) References Cited

U.S. PATENT DOCUMENTS 7,610,375 B2 * 10/2009 Portolani ............ H04L 63/0218
709/224
8,195,793 B2 * 6/2012 Prescott ................ H04L 43/028
709/224

(Continued)

OTHER PUBLICATIONS

Paquette, Scott, Paul T. Jaeger, and Susan C. Wilson. "Identifying the security risks associated with governmental use of cloud computing." Government information quarterly 27.3 (2010): 245-253. (Year: 2010).*

(Continued)

*Primary Examiner* — Michael Simitoski
(74) *Attorney, Agent, or Firm* — Byrne Poh LLP

(57) ABSTRACT

A cloud security method implement web security at the application level by monitoring network traffic and detecting cloud activities related to web applications, and then classifying the detected cloud activities to map certain security-related cloud activities into activity categories to enable security policy to be applied. The application-level cloud security method enables policy enforcement rules to be established for cloud activity categories. The security policies are then applied based on activity categories.

18 Claims, 5 Drawing Sheets

(51) Int. Cl.
*H04L 12/26* (2006.01)
*G06F 12/14* (2006.01)

(56) References Cited

U.S. PATENT DOCUMENTS

| | | | | |
|---|---|---|---|---|
| 8,320,381 | B2* | 11/2012 | Lange | H04L 47/10 370/395.21 |
| 9,369,433 | B1* | 6/2016 | Paul | H04L 63/0227 |
| 9,407,664 | B1* | 8/2016 | Banerjee | H04L 63/20 |
| 9,832,209 | B1* | 11/2017 | Cooley | H04L 63/101 |
| 9,917,852 | B1* | 3/2018 | Xu | H04L 63/1416 |
| 9,977,921 | B2* | 5/2018 | Sprague | G06F 21/6209 |
| 10,237,149 | B1* | 3/2019 | Guo | H04L 67/025 |
| 2003/0149888 | A1* | 8/2003 | Yadav | H04L 63/1408 726/23 |
| 2008/0034424 | A1* | 2/2008 | Overcash | H04L 63/1416 726/22 |
| 2008/0104699 | A1* | 5/2008 | Gounares | G06F 9/468 726/22 |
| 2010/0058366 | A1* | 3/2010 | Swildens | G06F 11/3684 719/329 |
| 2010/0095348 | A1* | 4/2010 | Foster | G06F 21/6236 726/1 |
| 2010/0299302 | A1* | 11/2010 | Gopshtein | G06N 7/005 706/52 |
| 2010/0299437 | A1* | 11/2010 | Moore | H04L 67/1008 709/226 |
| 2011/0022642 | A1* | 1/2011 | deMilo | G06F 17/30082 707/805 |
| 2011/0219426 | A1* | 9/2011 | Kim | H04L 41/5058 726/1 |
| 2011/0277034 | A1* | 11/2011 | Hanson | G06F 21/554 726/25 |
| 2012/0167162 | A1* | 6/2012 | Raleigh | H04L 63/10 726/1 |
| 2012/0210427 | A1* | 8/2012 | Bronner | H04L 63/30 726/23 |
| 2012/0240183 | A1* | 9/2012 | Sinha | H04W 12/08 726/1 |
| 2014/0342691 | A1* | 11/2014 | Kalavade | H04L 67/22 455/405 |
| 2015/0172321 | A1* | 6/2015 | Kirti | H04L 63/20 726/1 |
| 2015/0195166 | A1* | 7/2015 | Kalavade | H04W 24/08 709/224 |
| 2016/0127407 | A1* | 5/2016 | Mankovskii | H04L 63/1433 726/1 |
| 2016/0173529 | A1* | 6/2016 | Baig | H04L 63/1458 726/13 |
| 2016/0275303 | A1* | 9/2016 | Narayanaswamy | G06F 21/6218 |
| 2016/0330246 | A1* | 11/2016 | Narayanaswamy | H04L 67/20 |
| 2017/0104851 | A1* | 4/2017 | Arangasamy | H04L 69/22 |
| 2017/0195291 | A1* | 7/2017 | Yadav | H04L 67/104 |
| 2017/0251013 | A1* | 8/2017 | Kirti | H04L 63/1416 |
| 2018/0027006 | A1* | 1/2018 | Zimmermann | H04L 63/0245 726/11 |
| 2018/0041376 | A1* | 2/2018 | Li | H04L 41/0246 |
| 2018/0152534 | A1* | 5/2018 | Kristiansson | H04L 67/16 |
| 2018/0173555 | A1* | 6/2018 | Lutas | G06F 9/45558 |

OTHER PUBLICATIONS

N. S. Aljurayban and A. Emam, "Framework for cloud intrusion detection system service," 2015 2nd World Symposium on Web Applications and Networking (WSWAN), Sousse, 2015, pp. 1-5, doi: 10.1109/WSWAN.2015.7210298. (Year: 2015).*

Author Unknown, Modern Application Architecture for the Enterprise: Delivering agility, portability and control with Docker Containers as a Service (CaaS), www.docker.com, Jan. 21, 2016.

* cited by examiner

CLOUD SECURITY POLICY ENFORCEMENT FOR CUSTOM WEB APPLICATIONS

CROSS REFERENCE TO OTHER APPLICATIONS

This application claims priority to U.S. Provisional Patent Application No. 62/393,466 entitled CLOUD SECURITY POLICY ENFORCEMENT FOR CUSTOM WEB APPLICATIONS, filed Sep. 12, 2016, which application is incorporated herein by reference for all purposes.

BACKGROUND OF THE INVENTION

Cloud computing is the use of computing resources, including hardware and software, that are delivered as a service over a network, typically the Internet. As cloud computing achieves increased popularity and adoption of cloud-based services by businesses increases, concerns over security and risks of using these cloud-based services become significant. Traditionally, systems and software applications were deployed in enterprise environments, such as within an enterprise's own private data network, with strict controls and policies to ensure that data and usage are compliant with the enterprise's standards. However, the adoption of cloud-based services offered by third parties creates a potential mismatch, or complete absence, of expected enterprise level controls. Enterprises are faced with the challenge of accessing risk exposure associated with the use of cloud-based services in order to apply compensating controls.

Enterprises adopting IaaS (Infrastructure as a Service) cloud services or PaaS (Platform as a Service) cloud services often have additional security concerns. In particular, it has been reported that substantial cloud security risk is agnostic to the cloud service provider but rather originates from the applications deployed in, and data stored in, cloud instances being run on the cloud services. Based on the shared responsibility risk model, customers are responsible for securing their applications and data that they store in these third party environments while the IaaS service providers are responsible for securing the infrastructure. In the case of an enterprise adopting an IaaS cloud service, the enterprise may face substantial security risk if sufficient security controls are not applied to protect themselves from an insider or a third party attacks. Accordingly, enterprises face barriers to IaaS or PasS cloud service adoption due to these unmitigated security risks associated with their applications and data in the cloud.

BRIEF DESCRIPTION OF THE DRAWINGS

Various embodiments of the invention are disclosed in the following detailed description and the accompanying drawings.

DETAILED DESCRIPTION

Figure 1:
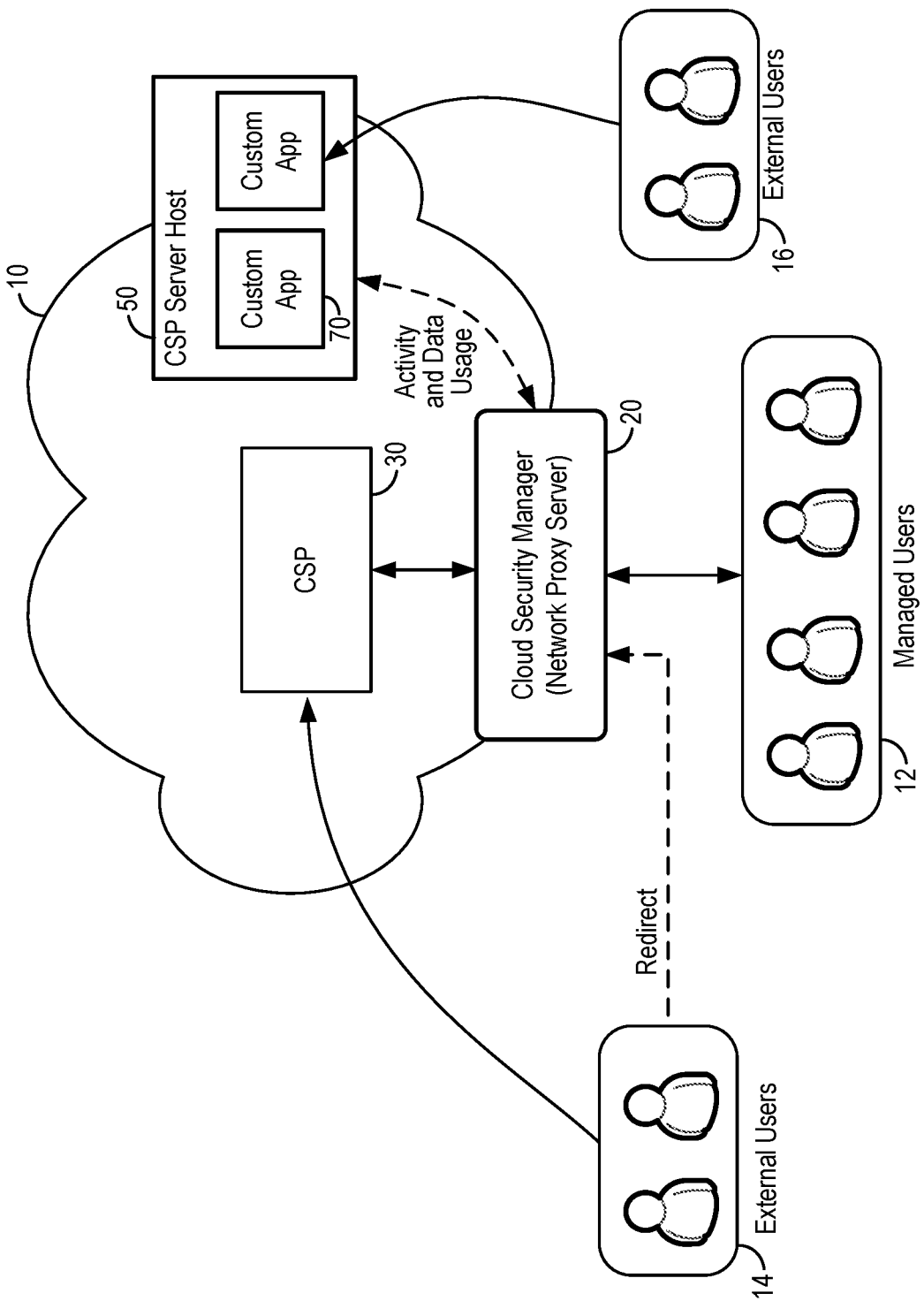
FIG. 1 illustrates an environment in which the cloud security method of the present invention can be implemented in some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

According to embodiments of the present invention, a cloud security method implement web security at the application level and at the data level by monitoring network traffic and detecting cloud activities related to web applications, and then classifying the detected cloud activities to map certain security-related cloud activities into activity categories to enable security policy to be applied. The application-level cloud security method enables policy enforcement rules to be established for cloud activity categories. With cloud activities thus classified into categories, the cloud security method can then apply security policies based on activity categories. The application-level cloud security method is thus able to implement effective web security measures for cloud applications or web applications in general and for the data being exchanged, including off-the-shelf applications or custom applications.

The application-level cloud security method can be advantageously applied to implement a self-service model for implementing cloud application security. Security policy enforcement for web applications or cloud applications is realized by detection and classification of security-related cloud activities into activity categories. Security policies are established per cloud activity category so that security policies can be immediately enforced once detected cloud activities are mapped to respective activity categories. As a result, cloud security implementation can be delegated to an entity different from the application owner or developer and cloud security policies can be applied without knowledge of what the web application does. The cloud security method of the present invention enables a self-service model for cloud security where the custom application developer or owner are relieved from having to develop cloud security policies and implementations but instead can use the cloud security method of the present invention to automatically detect the web applications and to automatically map cloud activities to security policies to provide cloud security at the application level and at the data level. Finally, the application-level cloud security method can be deployed to different fabrics in a multi-tenant environment to enable easy and fast adoption of cloud application security.

In embodiments of the present invention, the application-level cloud security method is configured to provide threat detection and data security including data encryption, data loss prevention, data compliance, and access control. A salient feature of the application-level cloud security method of the present invention is that cloud security is provided at the application and data level. Conventional cloud security solutions are focused on providing security at the cloud infrastructure level or at the network level only. Threats or data breaches arising from the application itself are often not protected by such infrastructure and network level security measures. The cloud security method of the present invention implements security at the application and data level to protect web applications from risks and threats not protected by conventional cloud security solutions. Furthermore, the application-level cloud security method deploys security measures as close as possible to the application to ensure effective security enforcement.

The application-level cloud security method is especially advantageous when applied to custom applications developed by enterprises where canned web security measures are not available and custom web security measures for the custom applications have to be manually set up. The cloud security method of the present invention can be applied to a custom application to automatically detect cloud activities from the custom application and to classify or map security-related cloud activities to activity categories so as to apply policy enforcement. The cloud security method provides application-level security measures that can be dynamically updated or updated in real-time to ensure that desired web security measures are implemented quickly and applied to existing or new custom applications.

In embodiments of the present invention, the application-level cloud security method can be implemented using several deployment methods, including infrastructure deployment, network level deployment, security service deployment and application level deployment. Once deployed, the application-level cloud security method operates under centralized management. In some embodiments, the application-level cloud security method may operate under centralized cloud-based management.

In some embodiments, the application level deployment of the cloud security method is implemented as an embedded container-level deployment using a container reverse proxy. According to embodiments of the present invention, a cloud security method embeds a reverse proxy in an application container containing one or more custom applications of an enterprise to implement cloud security monitoring and control for the custom applications. The container reverse proxy functions as a cloud security enforcement point to capture cloud activities and data transactions at the web application level for the enterprise. The container reverse proxy can be used alone or in addition to other cloud security enforcement points that may be deployed at the cloud infrastructure level, the enterprise infrastructure level or at the network level. The cloud security method overlies security control for custom applications independent of the programming language or platform for which the custom applications have been developed. Furthermore, the cloud security method can be applied to custom applications deployed in a private cloud environment, in a public cloud environment, or a hybrid cloud environment. The cloud security method realizes a security framework with preconfigured security policies that address application security needs. The cloud security method enables the same set of security measures to be implemented for all of the enterprise's custom applications to monitor and detect threats associated with cloud usage activities. As thus deployed, the application-level cloud security method of the present invention provides enterprises with visibility as well as threat detection and data security for the enterprise's custom applications.

In the present description, the terms "web application" and "cloud application" are used interchangeably to refer to a software application developed to be executed on a public or private data network, such as the Internet and an enterprise data network. Furthermore, in the present description, the term "custom application" refers to a software application that is developed or written or built for an enterprise according to the enterprise's specification. A custom application may also be referred to as a "custom web application" or a "custom cloud application".

In some examples, the custom applications are built using microservices. The application-level cloud security method of the present invention can be advantageously applied for applications built from microservices that are run in hybrid cloud or hybrid IT environments. A hybrid cloud or hybrid IT environment refers to an enterprise computing environment in which an organization provides and manages some resources in-house or on-premises but uses cloud-based services for others resources. In other applications, the enterprise may deploy custom applications built using microservices across multiple cloud service providers, including public or private cloud services.

Another feature of the application-level cloud security method of the present invention is that implementation and deployment of cloud security is decoupled from application development and cloud security is implemented and deployed without involvement of the software developer. The cloud security method is therefore applicable for legacy cloud applications as well as newly developed applications. In some embodiments, the cloud security method is deployed at the application container level to provide application and data level security without requiring the software or application developer to incorporate the security measures into the custom application of the enterprise. Importantly, the cloud security method enables the same set of enterprise-selected cloud security measures to be applied to all of the enterprise's custom applications. In this manner, the enterprise can define a common cloud security framework for custom applications with standardized and unified cloud security measures and access control that can be efficiently deployed to all of the enterprise's custom applications. By removing the implementation of cloud security from software developer, the development process for applications is greatly simplified without sacrificing security.

Another feature of the application-level cloud security method of the present invention is that both application level security and cross-application security can be implemented. In some cases, threats or anomalous activities can be more easily gleamed from cloud activities of two or more related custom applications. In most cases, it is difficult or impossible to have visibility into the cloud activities across multiple applications for threat detection. In embodiments of the present invention, the application-level cloud security method provides visibility into cross-application activities, thereby increasing the threat detection effectiveness. In particular, user behavior can be analyzed across web applications to provide insight into anomalous activities which can be a threat to the application or the enterprise.

In the present description, "cloud infrastructure" refers to the hardware and software components—such as servers, storage, networking and virtualization software—that are needed to support the computing requirements of a cloud computing environment of shared processing resources and data. In addition, cloud infrastructures include a software abstraction layer that virtualizes resources and logically presents the resources to cloud computing users through programmatic means. The cloud computing model enables ubiquitous and on-demand access to a shared pool of configurable computing resources which can be rapidly provisioned and released with minimal management effort. As an example, cloud computing and storage solutions provide enterprises with capabilities to store and process their data in third-party data centers, realizing efficient implementation and economy of scale.

In the present description, an "application container," also known as a "software container," refers to a computing structure or computing construct where one or more applications are isolated in a self-contained area in an operating environment. An application container (or "app container" or "container") packages an application with all of its dependencies into a standardized unit of software. Application containers, containing one or more applications, can be built or developed without regard to the operating system or platform. Application containers can further be transported across different infrastructures and be deployed to run in various computing environments. An application that is formed inside a container is sometimes described as a "containerized" application.

By way of explanation, a container wraps up an application in a complete file system that contains everything the application needs to run, including the application code, the runtime, the system tools, and the system libraries. App containers ensure that applications can always run the same, regardless of the operating environment or operating system the applications are running on. Containers isolate applications from each other and from the underlying infrastructure. Accordingly, containers run as an isolated process on the host operating system but are not tied to any specific infrastructure. Therefore, application containers can run on any computer, on any infrastructure and in any cloud services. A salient feature of application containers is that the container computing structure enables distributed applications to be developed, transported and run on any computing platform or any operating system. For example, an application container, with applications contained therein, can be moved across data centers for deployment and can be scaled as needed. Once an application is configured inside a container, the application can be moved across the data network, over the publicly accessible Internet or private networks.

By way of comparison, an application container is different from a virtual machine or a virtual container host in that a virtual machine or virtual container host runs application within its own operating system instance. That is, each virtual machine has included therein a complete operating system instance. An application container, on the other hand, shares the host server's operating system kernel to execute work and does not include an operating system instance. An application container realizes software isolation while a virtual machine realizes hardware isolation.

Application containers enable application developers to build an application from microservices. In the present description, the term "microservices" refer to small pieces of software where each piece of software is designed for a very specific job. Microservices are designed to have each service built with all of the necessary components to "run" a specific job with just the right type of underlying infrastructure resources. Then, these services are loosely coupled together so the individual services can be changed at any time, without changing the services that come before or after it. Microservices are advantageously applied in building distributed software applications using technology agnostic protocols.

FIG. 1 illustrates an environment in which the cloud security method of the present invention can be implemented in some embodiments. Referring to FIG. 1, an enterprise may adopt the use of cloud-based services from a cloud service provider 30 through a public data network 10, such as the Internet. To ensure security associated with the use of one or more cloud based services, the enterprise may redirect all network traffic destined for one or more cloud service providers through a cloud security manager 20, which can be implemented as a network intermediary or a network proxy server. In the present description, a proxy server refers to a server, which can be a computer system or a software application, that acts as an intermediary for requests from clients seeking resources from other servers. The cloud security manager 20 may be configured as reverse/forward proxies. The enterprise may include managed users 12 whose computing devices are configured to direct all public network activities through the network proxy server 20. Thus, requests and data from the managed user devices are intercepted by the network proxy server 20 before reaching the cloud service provider 30. In some embodiments, the network proxy server 20 performs encryption of data before sending the data onto the cloud service. The cloud-based service may be a cloud storage service, customer relationship management (CRM) services, information technology (IT) services or other types of cloud services. In one embodiment, the network proxy server 20 is a cloud-based service and may be deployed on the publicly accessible Internet, such as public data network 10. In other embodiments, the network proxy server 20 may be deployed on a private data network of an enterprise, or be deployed on a third party private data network.

As thus configured, a managed user in an enterprise data network 10, wishing to use the services of the cloud service provider 30, communicates with the cloud service provider 30 through the cloud security manager/network proxy server 20. The network proxy server 20 can then manage the security of the activities and data being transmitted to and from the computing devices of the managed user.

In some cases, the enterprise may include external users 14 whose computing devices are not preconfigured to redirect network activities through the network proxy server 20. The external users 14 therefore may access the cloud service provider 30 directly, without going through the cloud security manager 20. In that case, the enterprise may configure the cloud service provider 30 to redirect the external users 14 to the cloud security manager 20 when the external user accesses the cloud service provider on behalf of the enterprise.

In other cases, the enterprise may have custom web applications 70 that are deployed on the data network 10. In particular, the custom applications 70 are often deployed on a server hosted by a cloud service provider 50 ("CSP server host"). The custom applications 70 may be accessed by users 16 who may be employees of the enterprise, or partners or customers of the enterprise. Often the access to custom applications 70 is not managed, that is, the computing devices used by users 16 to access the custom applications 70 are not preconfigured to redirect network activities through the network proxy server 20. Therefore, users 16 may access custom applications 70 directly. Although in some cases, cloud infrastructure level security measures may be provided, cloud infrastructure level security measures may not be sufficient to protect the custom applications and data transactions at the custom applications.

According to embodiments of the present invention, an application-level cloud security method is employed by the enterprise to implement threat detection and data security for custom applications of the enterprise. In particular, the application-level cloud security method provides application and data level protections for custom applications. Conventional security measures are often inadequate in protecting custom applications of enterprises. In some embodiments, the cloud security method implements cloud security measures, including cloud activity monitoring, threat detection, access control, data encryption and data loss prevention. In some embodiments, the cloud security method is configured to intercept network activities to and from the custom applications 70 and users 16. Furthermore, in some embodiments, the cloud security method implements centralized management. For example, the cloud security method may be configured to provide the detected cloud activity and monitoring data to the cloud security manager 20 for further processing and for security action initiation.

Figure 2:
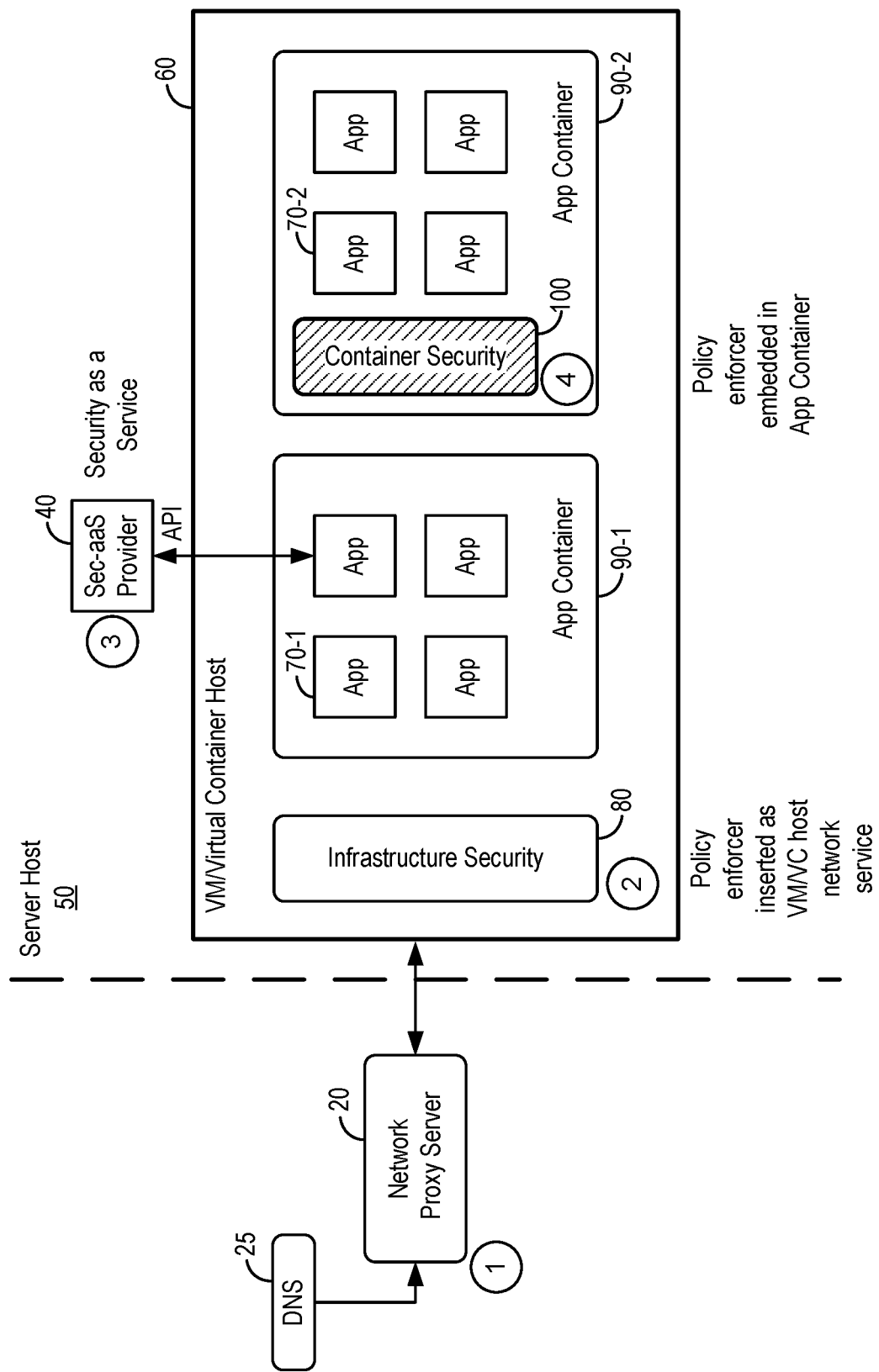
FIG. 2 illustrates various deployment methods that can be used to implement the application level cloud security method in embodiments of the present invention.

FIG. 2 illustrates various deployment methods that can be used to implement the application level cloud security method in embodiments of the present invention. Referring to FIG. 2, a cloud service provider 50 providing hosting services for its tenants includes one or more servers serving as server hosts. A tenant, adopting the service of the cloud service provider 50, may use the server to host one or more web applications 70 to be used by users of the tenant. In most cases, the tenant deploys a virtual machine (VM) or a virtual container host (VCH) 60 in which the tenant's applications 70 are executed. Furthermore, in some cases, the tenant may embody the applications 70 inside an application container 90, such as containers 90-1 and 90-2.

To ensure security of the activities and data exposed by the web applications 70, including custom applications of the tenants, the cloud service provider or the tenant of the cloud service provider deploys the application-level cloud security method of the present invention. The application-level cloud security method of the present invention detects and monitors cloud activities to implement security measures for web applications and data. In embodiments of the present invention, four deployment options may be used to establish the cloud security enforcement points for cloud activities detection. More specifically, the cloud security enforcement points are network locations where cloud activities and data may be captured and monitored by the cloud security method of the present invention.

A first deployment option, denoted as "1" in FIG. 2, inserts a network proxy server 20 as a network intermediary using a DNS server 25 so that data traffic between user computing devices and the web applications are routed through the network proxy server 20. In this manner, cloud activities and data to and from the web applications may be captured and monitored by the proxy server 20. The first deployment option is an example of a network level deployment.

A second deployment option, denoted as "2" in FIG. 2, uses cloud infrastructure security where a policy enforcer 80 is inserted at the VM host network service. In this manner, data traffic between user computing devices and the web applications are captured by the infrastructure security module 80. In this manner, cloud activities and data to and from the web applications may be captured and monitored by the infrastructure security module 80. The second deployment option is an example of an infrastructure deployment.

A third deployment option, denoted as "3" in FIG. 2, uses a Sec-aaS provider 40 where the security service is exposed as a service (Sec-aaS). In this case, the web application 70 has to be programmed to invoke the Sec-aaS service, such as by calling the API, to perform the security function. As thus configured, cloud activities and data to and from the web applications may be captured and monitored at the Sec-aaS provider 40. The third deployment option is an example of security service deployment.

In embodiments of the present invention, a fourth deployment option, denoted as "4" in FIG. 2, uses a container reverse proxy 100 for containerized applications as the cloud security enforcement point. The fourth deployment option is an example of an embedded container-level deployment. More specifically, the container reverse proxy 100 is embedded or inserted into the application container of the containerized web application to use as the cloud security enforcement point. In one embodiment, the containerized cloud security reverse proxy is embedded by accessing an API of the application container to generate a reverse proxy configuration. In the present embodiment, the container reverse proxy 100 is inserted into the application container 90-2 containing web applications 70-2. The container reverse proxy 100 is inserted in front of the web applications 70-2 in the path of the network traffic between the web applications and the data network connected to the user computing devices. In one example, the application container 90 is a Docker application container, as provided by Docker, Inc. and available from www.docker.com. As thus configured, the container reverse proxy 100 is deployed to force network traffic to and from the containerized applications 70-2 through the container reverse proxy so that cloud activities and data can be captured and monitored for threat detection by the cloud security method.

In the above-described embodiments, four deployment options for the cloud security method of the present invention are described. It is imperative to note that the four deployment options described are illustrative only and other deployment methods can be used to detect and capture cloud activities from web applications being executed in a cloud service provider. Furthermore, the cloud security method may be implemented using one or more of any of the aforementioned deployment options. It is not necessary to use all four of the deployment options described above. In fact, any one of the aforementioned deployment options may be used or any two or more of the aforementioned deployment options may be used in any combination to implement the cloud security method of the present invention.

In embodiments of present invention, the use of the container reverse proxy 100 to provide cloud security for web applications 70 provides particular advantages in realizing application level security and enabling the use of canned cloud security measures for all custom applications of an enterprise. The container reverse proxy 100 forms a common security framework providing standardized security measures which can be deployed in all of the containerized applications of the enterprise. FIG. 2 illustrates one instance of the container reverse proxy 100. In actual implementation, the enterprise may deploy a container reverse proxy to every application container containing custom applications of the enterprise. The same security measures can then be applied to all of the enterprise's applications.

With the use of the containerized cloud security reverse proxy, the same containerized cloud security reverse proxy can be deployed across all other custom applications of the enterprise. More specifically, the same containerized cloud security reverse proxy can be deployed in any and all application containers containing custom web applications of an enterprise, allowing unified and centralized security monitoring and control. In some embodiments, the containerized cloud security reverse proxy are auto-discoverable and is capable of supporting rapid spin-up and spin-down of proxies.

A particular advantage of using the container reverse proxy as the cloud security enforcement point is that the container reverse proxies in all the application containers can be updated simultaneously. In this manner, the same standardized, uniform security measures can be consistently applied to all custom applications of the enterprise hosted by one or more cloud service providers. In this manner, the cloud security method enables centralized management and control of distributed web application and security controls for custom applications deployed in hybrid cloud environments.

In some embodiments, the cloud security method provides real time control through the container reverse proxy. The container reverse proxy applies enforcement policies and may apply real-time control to block requests or deny access based on the enforcement policies. In other embodiments, the container reverse proxy can be configured to monitor the performance of the web application 70 and/or the stability of the web application 70. In some examples, the container reverse proxy can be configured to detect changes in the API (application programming interface) or the UI (user interface) of the web application.

With the use of one or more of the cloud security enforcement points described above, cloud activities at one or more web applications are detected and monitored. In some embodiments, each of the cloud security enforcement points is configured to detect cloud activities and report detected cloud activities and data to a centralized cloud security manager. The cloud security manager analyzes the cloud activity and the data to generate cloud security policies for protecting the cloud activities and data exposed by the web applications. In this manner, network security for custom web applications can be implemented by detecting and categorizing cloud activities, without requiring custom built security policies. In some embodiments, the cloud security manager analyzes the cloud activity and the data across multiple web applications to generate cross-application security policies. The cloud security manager provides the cloud security policies to a policy enforcement module. The policy enforcement module monitors the network traffic to detect threats and to enforce or apply appropriate security policies.

In the present description, "application-level" cloud security refers to providing cloud security by monitoring and detecting cloud activities at the application level. Conventional cloud security methodologies include network level security which examines the IP flows, such as the 5 tuples, for threat detection. That is, network level security involves examining the IP source address, the IP destination address, the source and destination ports, and the protocol in use. Network level security is not aware of the context of the IP flows and what the IP activities are actually doing. Other conventional cloud security methodology may involve examining the network traffic for threat detection. For example, network traffic level security may examine the HTTP request line for the HTTP methods (e.g. GET, POST, HEAD, OPTIONS, PUT, DELETE, TRACE and CONNECT) and other related information for threat detection. Although network traffic level security examines the requests and response of the network traffic, it is not aware of the context of the network traffic beyond the HTTP methods.

On the other hand, the cloud security method of the present invention implements cloud security based on cloud activities at the application level, which are sometimes referred to as "application activities". In the present description, the term "application activity" describes a cloud activity in the context of the web application. For example, application activities can include network traffic for sending a text message, for receiving a text message, for uploading data or file, for viewing a contact.

In embodiments of the present invention, the cloud security method detects and identifies cloud activities that are application activities in the network traffic. The detected application activities are then classified and mapped into different activity categories. In some embodiments, the activity categories include Administration, Data Access, Data Delete, Data Download, Data Sharing, Data Updates, External Data Sharing, Login Success, Report Execution, Service Usage, User Account Creation, User Account Deletion and other cloud-related activities. The cloud security method assigns security policy to each activity category. Accordingly, with a cloud activity mapped to an activity category, the security policy can be automatically applied to the cloud activity. The same security policy for an activity category is applied to all cloud activities mapped to the activity category. In this manner, effective cloud security can be provided to custom web applications based on the application activities of the web applications, without requiring security policy to be individually created for the custom web applications.

More specifically, in the area of cloud security, providers and enterprises generally have three areas of concerns: the cloud service, cloud activity, and cloud data. In embodiments of the present invention, the cloud security method implements cloud security policy enforcement at the web application level and at the cloud data level. The cloud security method identifies activities of a web application or web service which may be high risk so that security enforcement policy can be applied. For custom web applications, conventional security solutions would require the user or the developer to manually set up the security policy for the activities of each custom application. The conventional solutions are not desirable as it is labor-intensive and requires each custom application to have its own set of security policies. The cloud security method of the present invention provides a self-service model for cloud security through automatic detection and classification of cloud activities for any web applications, including custom web applications. In general, cloud activity is defined by an Action-Object pair, where the cloud activity is the action and the object is the cloud data. By detecting and classifying cloud activities, the cloud security method of the present invention realizes cloud security at the application level and at the data level.

Figure 3:
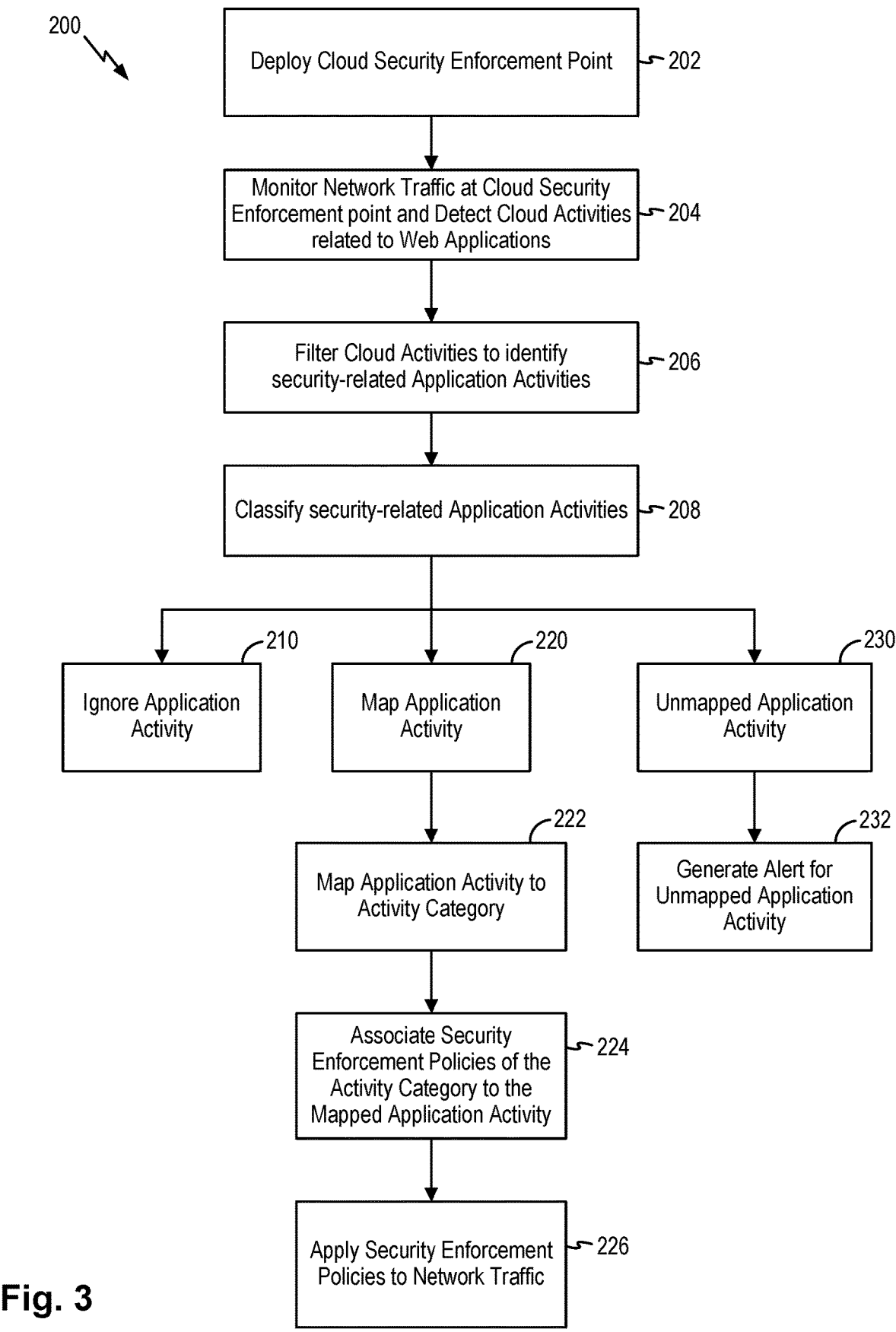
FIG. 3 is a flowchart illustrating the application-level cloud security method in embodiments of the present invention.

FIG. 3 is a flowchart illustrating the application-level cloud security method in embodiments of the present invention. Referring to FIG. 3, an application-level cloud security method 200 ("method 200") implements cloud security for one or more web applications by first deploying one or more cloud security enforcement points (202). As described above, a cloud security enforcement point can be deployed at the network traffic level by using a network proxy server to intercept network traffic to and from the web applications. Alternately, a cloud security enforcement point can be deployed at the cloud infrastructure level by inserting an infrastructure security module at the cloud host service. In another example, a cloud security enforcement point can be deployed using a security device exposed as a service (Sec-aaS). Finally, a cloud security enforcement point can be deployed as a container reverse proxy for containerized web applications. Other cloud security enforcement points can also be used, including the use of a plug-in at the user device.

With the cloud security enforcement point deployed, the method 200 monitors the network traffic and detects cloud activities that are related to web applications, referred herein to as application activities (204). The method 200 then filters the cloud activities to identify application activities that are security related (206). Other application activities that are not security-related may be filtered out or discarded. More specifically, cloud activities that may have security implications can include uploading and downloading of files, creating of users, and sharing of files with a third party. Alternately, cloud activities that may not have security implications can include sharing of a file with the user himself.

The method 200 then classifies the security-related application activities (208). In some embodiments, the method 200 applies heuristics to classify the application activities into groups and to further map the application activities to activity categories. In the present embodiment, the method 200 first classifies the activities into one of three groups: an ignore group, a map group and an unmapped group. In some embodiments, the method 200 may determine certain application activities as having low security risk and may classify an application activity into the ignore group (210). For example, the method 200 may determine that the application activity involves only viewing of static resources. In that case, the activity has low security risk and can be ignored. No further action is needed for application activities classified into the ignore group. In other embodiments, the method 200 may determine certain application activities as having certain security risk and will classify an application activity into the map group (220) where the application activity is to be mapped to an activity category (222). In yet other cases, the method 200 may determine certain application activity cannot be classified into any existing activity category and will classify the application activity into the unmapped group (230). The method 200 may generate an alert when unmapped application activity is detected (232). The alert may be sent to a system administrator of the enterprise or the cloud service so that the unmapped activity can be reviewed and the activity categories can be updated to include the unmapped application activity.

In the present embodiment, the method 200 classifies the application activities into three groups. The use of three classification groups are illustrative only and is not intended to be limiting. In other embodiments, the method 200 can be implemented with the map activity group in combination with none or one or more other groups. The method 200 needs only to have the map activity group to map application activities to activity categories. The other classification groups are optional.

For application activities that are to be mapped (220), the method 200 maps the application activity to respective activity categories based on the signature of the activity (222). In some embodiments, the method 200 uses a keyword based detection method to classify and map the application activities. The activity categories can include Administration, Data Access, Data Delete, Data Download, Data Sharing, Data Updates, External Data Sharing, Login Success, Report Execution, Service Usage, User Account Creation, User Account Deletion and other cloud-related activities. In one example, the method 200 may map an application activity by examining the request and response payload to determine if the activity is an upload or download of files. When a file is to be uploaded for downloaded, there are certain protocol conventions used for the request and response. Therefore, by examining the request and response payload, the method 200 can determine if the application activity involves uploading or downloading of files from the cloud services and the application activity may then be mapped to the respective activity category. In another example, the method 200 may classify an application activity by examining the URL (universal resource locator) pattern. The URL pattern indicates the user and or the location of the resources being exchanged in the application activity. In yet another example, the method 200 may examine the HTML message header to determine the nature of the request. In summary, the method 200 examines the information contained in the network traffic identified as the cloud activity, such as the HTML message header, the URL, the request or response payload, to determine the type of action being performed by the cloud activity. Other methods can also be used to determine the type of action of the cloud activity for the purpose of classifying the cloud activity. In some cases, when the cloud security enforcement point is implemented as a plug-in at the user device, then the method 200 may examine the user input to determine the type of action being performed by the cloud activity.

Once an application activity is mapped to an activity category (222), the method 200 then associates the security enforcement policies of the activity category to the mapped application activity (224). The method 200 can then apply the security enforcement policies to the network traffic, including the web application activities just mapped (226). More specifically, for each activity category, there is associated with it a set of security enforcement policies. That is, cloud security enforcement policies are specified for each activity category. For example, for the Upload activity category, the cloud security enforcement policy may include performing a data loss prevent (DLP) scan. Therefore, by mapping application activities to activity categories, cloud security enforcement policy can be automatically applied to the cloud activity, without having to manually create enforcement policy for each application activity.

As thus configured, the application-level cloud security method implements cloud security for web applications by automatically discovering the web applications through detection of application activities and automatically applying enforcement policies for the web applications by mapping of application activities to activity categories and assigning enforcement policies based on the mapped activity categories.

Figure 4:
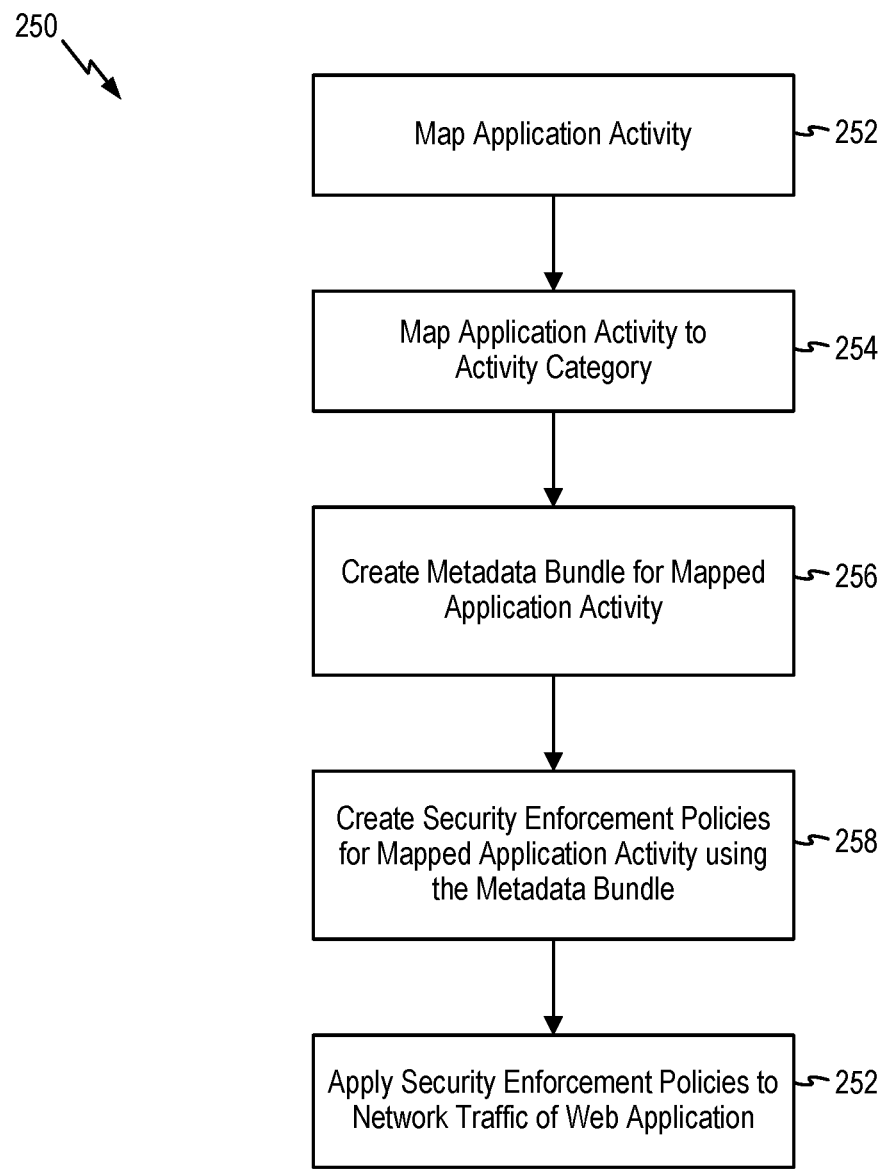
FIG. 4 is a flowchart illustrating the activity mapping process in the application-level cloud security method in embodiments of the present invention.

FIG. 4 is a flowchart illustrating the activity mapping process in the application-level cloud security method in embodiments of the present invention. In embodiments of the present invention, the cloud security method has determined that an application activity is to be mapped to an activity category and the activity mapping method 250 in FIG. 4 may be used. Referring to FIG. 4, method 250 received an application activity that has been classified into the map group (252). The method 250 then maps the application activity to one of the activity categories (254). The method 250 creates a metadata bundle containing information relating to the web application and the application activity and the mapped activity category (256). In some embodiments, the metadata bundle is a JSON (JavaScript Object Notation) formatted metadata bundle. The metadata bundle may contain information such as the name of the web application, the location where the application is deployed, the owner, the last update timestamp, the creation timestamp, the activity mapping list which includes activity name and URL. The metadata bundle may further include parameters and other http header and/or content patterns that match the mapped activity. The method 250 then uses the metadata bundle to create the security enforcement policy for the mapped application activity (258). The method 250 can then apply the security enforcement policies to the network traffic, including the web application activities just mapped (252).

Figure 5:
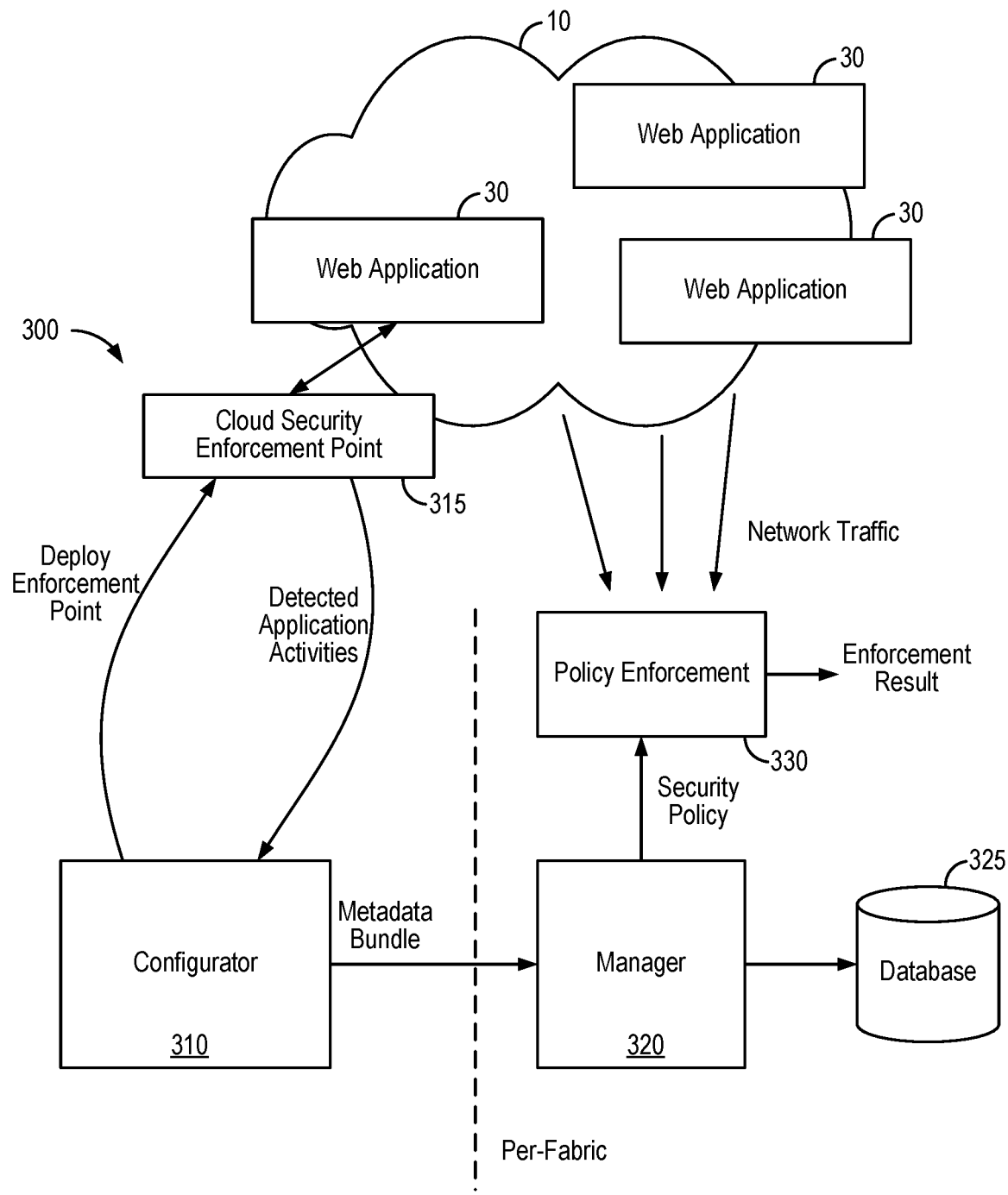
FIG. 5 is a system diagram illustrating a cloud security system which can be used to implement the application-level cloud security method in embodiments of the present invention.

FIG. 5 is a system diagram illustrating a cloud security system which can be used to implement the application-level cloud security method in embodiments of the present invention. Referring to FIG. 5, the cloud security system 300 includes a configurator 310 which can be constructed as a plug-in at a web browser or as a forward proxy. The configurator 310 generates instructions to deploy a cloud security enforcement point 315 for monitoring the cloud activity of one or more web applications 30. The cloud security enforcement point 315 provides detected cloud activities associated with the web applications to the configurator 310. When an application activity is detected, the configurator 310 implements the cloud security method described above to classify and map the application activity. The configurator 310 generates a metadata bundle for a newly detected application activity. The metadata bundle contains information describing the detected application activity and the mapped activity category.

The cloud security system 300 further includes a manager 320 in communication with a database 325. The metadata bundle generated by the configurator 310 is provided to the manager 320 which stores the metadata bundle in the database 325. The manager 330 also builds a set of security policy for the application policy using the information in the metadata bundle. The manager 320 further transfers the set of security policy to a policy enforcement module 330 which applies the set of security policy to the network traffic. The policy enforcement module 330 may generate enforcement results based on its enforcement action on the network traffic. For example, resource requests may be blocked, access may be restricted or denied, cloud data may be scanned for data loss prevention or tagged for encryption, and reports and alerts may be generated.

In embodiments of the present invention, the configurator 310 may continuously update the metadata bundles for the application activities so that the manager 320 may continuously update the security enforcement policies being applied. In some embodiments, the configurator, the manager and the policy enforcement may be a hardware component or a software component. In one embodiment, the configurator, the manager and the policy enforcement may be implemented as one or more software modules in a hardware processor. In some embodiments, the configurator, the manager and the policy enforcement can be constructed as a single software module or as two or more software modules.

In some embodiments, the cloud security method is configured to perform dynamic auto-tagging of HTML fields for encryption of custom objects in the web application. In one embodiment, the cloud security method identifies custom objects in the web application and tags the data fields associated with the custom objects. The tagged data files are then designated for encryption when the security enforcement policy is applied. More specifically, the cloud security method may identify an application activity as containing sensitive data. The cloud security method will then classify the application activity from a web application into an activity category that calls for encryption. For example, there may be an activity category ENCRYPT. The activity category ENCRYPT may be associated with a security policy to encrypt data in tagged data fields.

When the application activity is mapped to the activity category ENCRYPT, the application activity is associated with the tagged data fields and the mapped activity category ENCRYPT. The security policy to encrypt the tagged data fields will then be applied to the network traffic whenever the same application activity is encountered. In one example, a metadata bundle is created indicating the application activity, the associated web application, the tagged data fields and the mapped activity category ENCRYPT. The cloud security method uses the metadata bundle to identify the data fields of the application activity that are to be subjected to encryption.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of implementing cloud security policy enforcement for web applications being used by an enterprise, the method comprising:
monitoring network traffic to and from the enterprise using a hardware processor;
detecting and identifying a plurality of cloud activities relating to a web application using the hardware processor, wherein each of the plurality of cloud activities is an action being taken by the web application, wherein identifying each of the plurality of cloud activities includes identifying the type of action being performed by the cloud activity, and wherein at least one of the plurality of cloud activities is identified based on both a request and a response payload in the network traffic;
filtering the plurality of cloud activities to identify security-related application activities relating to the web application;
classifying the security-related application activities relating to the web application into at least a first group of application activities, a second group of application activities, and a third group of application activities, wherein a first portion of the security-related application activities are classified into the first group of application activities, wherein being classified into the first group indicates that the first group of application activities are each to be mapped to one of a first plurality of activity categories, wherein a second portion of the security-related application activities are classified into the second group of application activities, wherein being classified into the second group indicates that second group of application activities are each to be ignored, wherein a third portion of the security-related application activities are classified into the third group of application activities, wherein being classified into the third group indicates that the third group of application activities cannot be mapped to any of the plurality of activity categories, and wherein each of the first portion of the security-related application activities, the second portion of security-related application activities, and the third portion of the security-related application activities are different;

ignoring the second portion of the security-related application activities classified into the second group;

generating an alert in response to an application activity being classified into the third group, wherein the alert indicates that the application activity should be reviewed and that the plurality of activity categories may need to be updated to include the application activity; and for each application activity of the first portion of the security-related application activities relating to the web application:
- mapping the application activity to one of the plurality of activity categories based on a signature of the application activity, wherein each of the plurality of activity categories is associated with a corresponding set of one or more security enforcement policies and wherein the plurality of activity categories describe at least one of a data operation and an account operation;
- associating the corresponding set of one or more security enforcement policies of the mapped activity category to the application activity; and
- applying the corresponding set of one or more security enforcement policies to network traffic corresponding to the application activity based on the application activity being mapped to the mapped activity category.

2. The method of claim 1, further comprising for each application activity of the first portion of the security-related application activities:
- generating a metadata bundle containing information indicative of the application activity, the web application, and the one of the plurality of activity categories; and
- generating the corresponding set one or more of security enforcement policies for the application activity using the metadata bundle.

3. The method of claim 1, wherein the hardware processor implements a network proxy server to monitor network traffic to and from the enterprise.

4. The method of claim 1, wherein the hardware processor implements an infrastructure security module at a cloud service provider hosting the web application to monitor network traffic to and from the enterprise.

5. The method of claim 1, wherein the hardware processor implements a containerized cloud security reverse proxy embedded in a containerized web application to monitor network traffic to and from the enterprise, the containerized web application being configured in an application container.

6. The method of claim 5, further comprising:
embedding the containerized cloud security reverse proxy into the application container containing the containerized web application by accessing an application programming interface (API) of the application container to generate a reverse proxy configuration.

7. The method of claim 1, wherein the set of one or more security enforcement policies includes security policies for threat detection, data encryption, data loss prevention, and access control.

8. The method of claim 1, wherein a first application activity of the first portion of the security-related application activities is mapped to a first activity category, further comprising:
tagging at least one data field in the first application activity; and
associating a first security enforcement policy of the first activity category to the first application activity, the first security enforcement policy comprising encrypting data in the tagged data fields associated with the first application activity.

9. A system for implementing cloud security policy enforcement for web applications being used by an enterprise, the system comprising:
a processor; and
a memory coupled with the processor, wherein the memory is configured to provide the processor with instructions which when executed cause the processor to:
monitor network traffic to and from the enterprise;
detect and identify a plurality of cloud activities relating to a web application, wherein each of the plurality of cloud activities is an action being taken by the web application, wherein identifying each of the plurality of cloud activities includes identifying the type of action being performed by the cloud activity, and wherein at least one of the plurality of cloud activities is identified based on both a request and a response payload in the network traffic;
filter the plurality of cloud activities to identify security-related application activities relating to the web application;
classify the security-related application activities relating to the web application into at least a first group of application activities, a second group of application activities, and a third group of application activities, wherein a first portion of the security-related application activities are classified into the first group of application activities, wherein being classified into the first group indicates that the first group of application activities are each to be mapped to one of a first plurality of activity categories, wherein a second portion of the security-related application activities are classified into the second group of application activities, wherein being classified into the second group indicates that second group of application activities are each to be ignored, wherein a third portion of the security-related application activities are classified into the third group of application activities, wherein being classified into the third group indicates that the third group of application activities cannot be mapped to any of the plurality of activity categories, and wherein each of the first portion of the security-related application activities, the second portion of security-related application activities, and the third portion of the security-related application activities are different;

ignore the second portion of the security-related application activities classified into the second group;

generate an alert in response to an application activity being classified into the third group, wherein the alert indicates that the application activity should be reviewed and that the plurality of activity categories may need to be updated to include the application activity; and for each application activity of the first portion of the security-related application activities relating to the web application:

map the application activity to one of the plurality of activity categories based on a signature of the application activity, wherein each of the plurality of activity categories is associated with a corresponding set of one or more security enforcement policies and wherein the plurality of activity categories describe at least one of a data operation and an account operation;

associate the corresponding set of one or more security enforcement policies of the mapped activity category to the application activity; and apply the corresponding set of one or more security enforcement policies to network traffic corresponding to the application activity based on the application activity being mapped to the mapped activity category.

10. The system recited in claim 9, wherein the memory is further configured to provide the processor with instructions which when executed cause the processor to, for each application activity of the first portion of the security-related application activities:

generate a metadata bundle containing information indicative of the application activity, the web application, and the one of the plurality of activity categories; and generate the corresponding set of one or more security enforcement policies for the application activity using the metadata bundle.

11. The system recited in claim 9, wherein the memory is further configured to provide the processor with instructions which when executed cause the processor to:

provide a containerized cloud security reverse proxy embedded in a containerized web application to monitor network traffic to and from the enterprise, the containerized web application being configured in an application container.

12. The system recited in claim 9, wherein the set of one or more security enforcement policies includes security policies for threat detection, data encryption, data loss prevention, and access control.

13. The system recited in claim 9, wherein a first application activity of the first portion of the security-related application activities is mapped to a first activity category, and wherein the memory is further configured to provide the processor with instructions which when executed cause the processor to:

tag at least one data field in the first application activity; and associate a first security enforcement policy of the first activity category to the first application activity, the first security enforcement policy comprising encrypting data in the tagged data fields associated with the first application activity.

14. A non-transitory computer-readable medium containing computer executable instructions that, when executed by a processor, cause the processor to perform a method for implementing cloud security policy enforcement for web applications being used by an enterprise, the method comprising:

monitoring network traffic to and from the enterprise using a hardware processor;

detecting and identifying a plurality of cloud activities relating to a web application using the hardware processor, wherein each of the plurality of cloud activities is an action being taken by the web application, wherein identifying each of the plurality of cloud activities includes identifying the type of action being performed by the cloud activity, and wherein at least one of the plurality of cloud activities is identified based on both a request and a response payload in the network traffic;

filtering the plurality of cloud activities to identify security-related application activities relating to the web application;

classifying the security-related application activities relating to the web application into at least a first group of application activities, a second group of application activities, and a third group of application activities, wherein a first portion of the security-related application activities are classified into the first group of application activities, wherein being classified into the first group indicates that the first group of application activities are each to be mapped to one of a first plurality of activity categories, wherein a second portion of the security-related application activities are classified into the second group of application activities, wherein being classified into the second group indicates that second group of application activities are each to be ignored, wherein a third portion of the security-related application activities are classified into the third group of application activities, wherein being classified into the third group indicates that the third group of application activities cannot be mapped to any of the plurality of activity categories, and wherein each of the first portion of the security-related application activities, the second portion of security-related application activities, and the third portion of the security-related application activities are different;

ignoring the second portion of the security-related application activities classified into the second group;

generating an alert in response to an application activity being classified into the third group, wherein the alert indicates that the application activity should be reviewed and that the plurality of activity categories may need to be updated to include the application activity; and for each application activity of the first portion of the security-related application activities relating to the web application:

mapping the application activity to one of the plurality of activity categories based on a signature of the application activity, wherein each of the plurality of activity categories is associated with a corresponding set of one or more security enforcement policies and wherein the plurality of activity categories describe at least one of a data operation and an account operation;

associating the corresponding set of one or more security enforcement policies of the mapped activity category to the application activity; and applying the corresponding set of one or more security enforcement policies to network traffic corresponding to the application activity based on the application activity being mapped to the mapped activity category.

15. The non-transitory computer-readable medium of claim 14, wherein the method further comprises:

for each application activity of the first portion of the security-related application activities:

generating a metadata bundle containing information indicative of the application activity, the web application, and the one of the plurality of activity categories; and generating the corresponding set of one or more security enforcement policies for the application activity using the metadata bundle.

16. The non-transitory computer-readable medium of claim 14, wherein the method further comprises:

providing a containerized cloud security reverse proxy embedded in a containerized web application to monitor network traffic to and from the enterprise, the containerized web application being configured in an application container.

17. The non-transitory computer-readable medium of claim 14, wherein the set of one or more security enforcement policies includes security policies for threat detection, data encryption, data loss prevention, and access control.

18. The non-transitory computer-readable medium of claim 14, wherein a first application activity of the first portion of the security-related application activities is mapped to a first activity category, and wherein the method further comprises:

tagging at least one data field in the first application activity; and associating a first security enforcement policy of the first activity category to the first application activity, the first security enforcement policy comprising encrypting data in the tagged data fields associated with the first application activity.

* * * * *